United States Patent [19]

Dahlberg

[11] 4,349,401
[45] Sep. 14, 1982

[54] METHOD TO MANUFACTURE STRUCTURAL MEMBERS OF EPOXY PLASTIC

[75] Inventor: Anders Dahlberg, Täby, Sweden

[73] Assignee: Tatis Plasttäntningar AB, Täby, Sweden

[21] Appl. No.: 162,248

[22] Filed: Jun. 23, 1980

[51] Int. Cl.³ .............................................. B29C 27/00
[52] U.S. Cl. .................................... 156/221; 156/222; 156/242; 156/246; 156/289; 156/330; 264/258
[58] Field of Search ............... 156/212, 221, 222, 242, 156/246, 330, 289, 297, 300, 307.3, 307.4, 307.5; 264/258

[56] References Cited

U.S. PATENT DOCUMENTS

| | | | |
|---|---|---|---|
| 3,409,497 | 11/1968 | Roseland | 156/307.5 |
| 3,567,543 | 3/1971 | Standage | 156/307.4 |
| 4,252,593 | 2/1981 | Green | 156/231 |

Primary Examiner—Caleb Weston

[57] ABSTRACT

A method of producing laminated structural members, such as sheets or elongated profile elements, of fabric reinforced epoxy plastic. A reinforcement fabric is soaked with epoxy resin and a hardener. Upon hardening, a much thicker layer of epoxy resin, a hardener and a thickening agent is applied so as to form an intermediate layer. Onto the latter, a reinforcement fabric and optionally another thick intermediate layer and a thin fabric reinforced layer is applied. Finally, the resulting laminate product is permitted to harden on a support or a mould bed so as to form a rather rigid structural member.

5 Claims, 3 Drawing Figures

METHOD TO MANUFACTURE STRUCTURAL MEMBERS OF EPOXY PLASTIC

The invention relates to a method to manufacture sheet or elongated members, especially profile members, of fabric reinforced epoxy plastic. Epoxy plastics are used to an increasing extent in the building industry, e.g. as a coating on concrete floors, as an adhesive and as an injection or repair material in concrete structures.

Epoxy plastics have a number of good qualities which are of considerable value in this connection, namely among others a strong adhesion to most materials, dimensional stability after hardening, low shrinkage, chemical resistance and electric insulating capacity. However, seen from an industrial hygienic point of view as well as a practical one, epoxy plastics are difficult to handle, especially because of their extreme adhesiveness. Therefore, epoxy plastics have not been used so far as a basic construction material.

The main object of the invention is to achieve a practically suitable and, from an industrial hygienic point of view, relatively harmless method to manufacture sheet or profile members of fabric reinforced epoxy plastic. This is accomplished by the inventive method, the basic features of which are stated in the appended claim 1. Suitable further features appear from the sub-claims and the description below.

Thus, in the method of manufacturing according to the invention, one starts out with a rather thin fabric reinforced layer. It is possible to produce such a layer by spreading out a sheet of fabric, prefably a polyester material, on a support which is not adhesive relative to epoxy plastic. A suitable material for this purpose has turned out to be a thermoplastic foil, such as a polyethylene or a PVC foil, which is first laid out on a firm, preferably planar support, such as a table or the like. Then, the fabric is soaked with an epoxy resin and a hardener, so that upon hardening a rather flexible fabric reinforced layer is obtained, which can easily be removed from the supporting foil.

The basic feature of the invention is to let such a reinforced layer, possibly divided into plates or strips, form a support when applying thereon a rather thick intermediate layer consisting of an epoxy resin, a rather slow hardener and a thickening agent, such as an epoxy filler. The intermediate layer is smoothed, and a fluid epoxy resin is spread over the laminate. Then a reinforced fabric, preferably likewise a polyester material, is applied while being thoroughly drenched with an epoxy resin, so that another fabric reinforced layer is formed. Thereby a sandwich laminate is obtained, and the rather thick intermediate layer can maintain a substantially uniform thickness during the hardening process, even if the hardening takes place on a support having non-horizontal portions, e.g., for the manufacture of profile members.

If so desired, in order to obtain a thicker and stronger laminate, it is possible to apply another thick intermediate layer (epoxy resin, a hardener and a thickening agent) on top of the reinforcement fabric, preferably before the first intermediate layer is hardened, as well as still another fabric reinforced layer, preferably of the same kind as the first rather than fabric reinforced layer. This outer fabric reinforced layer can also be divided into plates, strips or the like. However, the intermediate layers and reinforcement fabrics should be continuous so as to secure high strength even of the joints between different segments or the like of the finished sheet or profile member.

Upon application of all layers to be included in the laminated structural member, the laminate is permitted to finally harden on a support or a mould bed corresponding in shape to the desired final product, so that a rather rigid member will result. Of course, the hardened member can be further treated by grinding and/or applying more epoxy plastic on certain portions, but normally such further treatment is not necessary.

An essential advantage of the invention is that the member can be moved before the final hardening process and be easily handled when being laid onto the support or the like. This is made possible by the already hardened, outer fabric reinforced layer which is dry and dimensionally stable, though somewhat resilient. In case the outer fabric reinforced layer is divided into strips or plates, which are to be mutually folded before the member is finally hardened, a tape can preferably be applied over the joints to prevent the separation and maintain adhesion of the intermediate layer.

As to the handling of a member having two intermediate layers, it may be advantageous to apply each intermediate layer on a separate supporting fabric reinforced layer and thereafter put both units together while laying a reinforced fabric between the two intermediate layers.

A preferred embodiment of the invention will now be described with reference to the drawing.

On a planar support a rather large and planar sheet (having the dimensions $0.5 \times 1000 \times 4500$ mm) is produced. The sheet consists of a polyester fabric soaked with epoxy resin and a hardener so as to constitute, upon hardening, a thin and flexible sheet. Before forming the sheet, the support is provided with a polyethylene foil so as to permit easy removal of the sheet from the support and division of the sheet as desired, in this case into strips 2, indicated by dashed lines to the left in FIG. 1. The division can be effected by sawing, shearing or cutting by means of a suitable tool.

Figure 1:
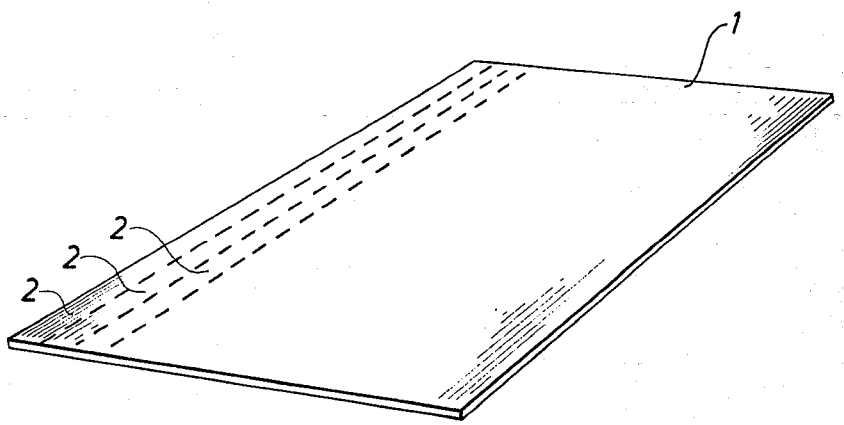
FIG. 1 shows schematically in perspective view a fabric reinforced layer.
Figure 2:
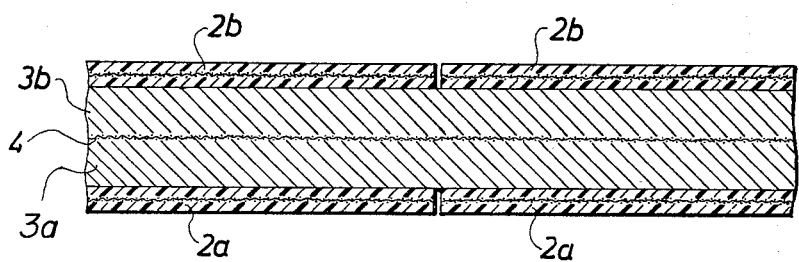
FIG. 2 shows in cross-section and in a larger scale a laminate before being hardened.
Figure 3:
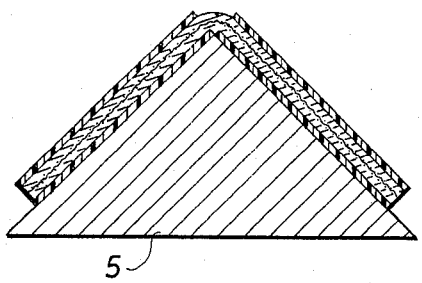
FIG. 3 shows in cross-section the laminate laid on a profiled support where it is permitted to harden.

For the manufacture of an elongated, angle profile member having mutually perpendicular and equally long legs, as in FIG. 3, two strips $2a$ ($0.5 \times 40 \times 4500$ mm) of the FIG. 1 sheet are first laid out, one adjacent to the other on a planar support. Thereafter, a first, rather thick (appr. 2 mm) intermediate layer $3a$ is applied. This layer, which consists of epoxy resin, a hardener and a thickening agent (such as epoxy putty), is smoothed and soaked with a fluent epoxy resin, whereupon a reinforcement fabric 4 is applied and soaked into the thin epoxy resin. Thereafter, a corresponding sheet member with two strips $2b$ and a second thick, still not hardened intermediate layer $3b$ is laid on top of the reinforcement fabric 4, so as to form a symmetrical, still not hardened laminate unit $2a$, $3a$, 4, $3b$, $2b$.

This laminate unit is laid on a support 5 having mutually perpendicular support surfaces, as indicated in FIG. 3. Upon hardening, the desired L-profile member of fabric reinforced epoxy plastic is obtained.

I claim:

1. A method of producing laminated structural members of plastic material comprising the following steps:

(a) saturating with an epoxy resin and corresponding hardner a first reinforcement fabric on a supporting surface and causing the same to harden in the form of a first thin, flexible fabric-reinforced layer;

(b) applying to said first layer a thicker layer comprising epoxy resin, a hardener and a thickening agent therefor to form a relatively thick intermediate layer;

(c) applying to said intermediate layer a fluid epoxy resin, a hardner therefor and a second reinforcement fabric; and (d) before hardening of the layer applied in step c, placing the resulting laminate on a support and causing the same to harden to form a substantially rigid structural member.

2. A method according to claim 1, wherein said first flexible layer to formed by spreading out said reinforcement fabric on a thermoplastic foil which is non-adhesive to epoxy resin and selected from the group consisting of polyethylene and polyvinylchloride foil, and applying thereto a thin layer of epoxy resin and hardener.

3. A method according to claim 2, wherein said first flexible layer is in the form of a sheet which is thereafter divided into segments of smaller dimension, each segment being further laminated as aforesaid.

4. A method according to claim 3, wherein said sheet is divided into strips and two of said strips, after application of said intermediate layer and said second reinforcement fabric and epoxy resin, are disposed with their ends adjacent one another and on the apex of a profiled support, and then caused to harden.

5. A method according to claim 4, wherein two opposed laminates of said first and intermediate layers are in turn laminated together, the opposed intermidate layers being separated by and bonded to said second reinforcement fabric.

* * * * *